United States Patent
Yoon et al.

(10) Patent No.: US 10,213,082 B2
(45) Date of Patent: Feb. 26, 2019

(54) ROBOT CLEANER

(71) Applicant: Samsung Electronics Co., Ltd., Suwon-si (KR)

(72) Inventors: Sang Sik Yoon, Yongin-si (KR); Kyong Su Kim, Hwaseong-si (KR); Shin Kim, Hwaseong-si (KR); Yong-Seok Kim, Suwon-si (KR); Kyung Shik Roh, Seongnam-si (KR); Hyun Soo Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 15/670,278

(22) Filed: Aug. 7, 2017

(65) Prior Publication Data

US 2018/0055325 A1 Mar. 1, 2018

(30) Foreign Application Priority Data

Aug. 30, 2016 (KR) .................. 10-2016-0111020
Dec. 14, 2016 (KR) .................. 10-2016-0170239

(51) Int. Cl.
*A47L 11/40* (2006.01)
*A47L 9/28* (2006.01)
(Continued)

(52) U.S. Cl.
CPC ......... *A47L 11/4011* (2013.01); *A47L 9/2805* (2013.01); *A47L 9/2852* (2013.01);
(Continued)

(58) Field of Classification Search
CPC .............. A47L 11/4011; A47L 11/4061; A47L 2201/04; A47L 9/2805; A47L 9/2852; G01S 15/931; G01S 17/88
See application file for complete search history.

(56) References Cited

U.S. PATENT DOCUMENTS 6,727,935 B1 * 4/2004 Allen ................ G01S 17/42
348/14.03
8,380,350 B2 * 2/2013 Ozick ................ A47L 5/30
700/253

(Continued)

FOREIGN PATENT DOCUMENTS

JP 2013-172961 9/2013
KR 10-2008-0093766 10/2008
(Continued)

OTHER PUBLICATIONS

International Search Report dated Dec. 20, 2017 in International Patent Application No. PCT/KR2017/008881.

*Primary Examiner* — Marc Carlson
(74) *Attorney, Agent, or Firm* — Staas & Halsey LLP

(57) ABSTRACT

A robot cleaner includes a housing a sensor assembly disposed in the housing, wherein the sensor assembly comprises a light source configured to emit light toward an area in front of the housing; a camera unit comprising a lens; a reflector configured to reflect light incident on a front of the housing toward a front region of the lens; and a guide member hollow inside configured to guide light incident on a top of the housing toward a rear region of the lens. The robot cleaner estimates a current position of the robot cleaner more accurately by correcting the current position of the robot cleaner estimated by using odometry information based on images acquired by the camera unit.

20 Claims, 16 Drawing Sheets

(51) Int. Cl.
 *G01S 15/93* (2006.01)
 *G01S 17/88* (2006.01)
(52) U.S. Cl.
 CPC ......... *A47L 11/4061* (2013.01); *G01S 15/931* (2013.01); *G01S 17/88* (2013.01); *A47L 2201/04* (2013.01)

(56) References Cited

U.S. PATENT DOCUMENTS

| | | | | |
|---|---|---|---|---|
| 9,020,641 B2* | 4/2015 | Jeong | ................... | G01S 17/936 |
| | | | | 359/639 |
| 9,423,797 B2* | 8/2016 | Lee | ...................... | G05D 1/0274 |
| 9,864,914 B2* | 1/2018 | Kim | ...................... | G01S 17/46 |
| 2009/0024251 A1 | 1/2009 | Myeong et al. | | |
| 2009/0028387 A1 | 1/2009 | Jeong et al. | | |
| 2013/0030750 A1* | 1/2013 | Kim | ...................... | G06N 3/004 |
| | | | | 702/108 |
| 2013/0076893 A1* | 3/2013 | Jeong | ...................... | G01S 17/00 |
| | | | | 348/135 |
| 2013/0116826 A1* | 5/2013 | Kim | ..................... | G05D 1/0246 |
| | | | | 700/259 |
| 2013/0204483 A1* | 8/2013 | Sung | .................. | A47L 11/4061 |
| | | | | 701/28 |
| 2014/0036062 A1* | 2/2014 | Yoon | ........................ | G01V 8/10 |
| | | | | 348/118 |
| 2014/0304937 A1* | 10/2014 | Kim | .......................... | A47L 9/28 |
| | | | | 15/319 |
| 2016/0375592 A1* | 12/2016 | Szatmary | ................... | B25J 5/00 |
| | | | | 700/255 |
| 2017/0332869 A1* | 11/2017 | Nam | ....................... | A47L 11/33 |
| 2017/0336798 A1* | 11/2017 | Nam | ....................... | A47L 5/22 |
| 2018/0164213 A1* | 6/2018 | Windorfer | ............ | G01N 21/251 |

FOREIGN PATENT DOCUMENTS

| | | | |
|---|---|---|---|
| KR | 20080093768 A | * | 10/2008 |
| KR | 10-2012-0118818 | | 10/2012 |
| KR | 10-2013-0137536 | | 12/2013 |
| KR | 10-2014-0123174 | | 10/2014 |

\* cited by examiner (a)

(b)

ROBOT CLEANER

CROSS-REFERENCE TO RELATED APPLICATIONS

This application claims the benefit of Korean Patent Application No. 10-2016-0111020 filed on Aug. 30, 2016, and Korean Patent Application No. 10-2016-0170239 filed on Dec. 14, 2016 in the Korean Intellectual Property Office, the disclosures of which are incorporated herein by reference.

BACKGROUND

1. Field

Embodiments of the present disclosure relate to a robot cleaner and a method of controlling the same, and more particularly, to a technique of serving as both an obstacle detection sensor to sense obstacles and a space recognition sensor to recognize the space surrounding the robot cleaner by using one camera unit.

2. Description of the Related Art

In the past, robots have been widely developed for industrial technology and have been widely used as a part of industrial automation. However, in recent years, with the continuous expansion of applications of robots, medical robots, aerospace robots, and the like have been developed, and moving robots for household use have been manufactured.

Moving robots refer to robots performing an operation in response to a command received from a user while autonomously moving in an area with no control by the user. For example, telepresence robots, security robots, and robot cleaners are moving robots.

In general, a robot cleaner is an apparatus that automatically cleans an area to be cleaned by sucking foreign substance such as dusts from the floor while autonomously traveling in the area to be cleaned in accordance with a preset program with no control by the user.

Because the robot cleaner is required to travel autonomously, a technique of accurately estimating a current position of the robot cleaner in real time and traveling with accurate recognition of obstacles around the robot cleaner.

Thus, the robot cleaner generally includes an obstacle sensor to prevent collision with an obstacle such as a wall while traveling and a camera unit to acquire image information of the space above the robot cleaner via light received from the top of the robot cleaner and recognize a current position of the robot cleaner using acquired images.

However, conventional robot cleaners according to the related art are not economically feasible because the robot cleaners include a sensor to sense obstacles and a camera unit to recognize the space in a surrounding environment of the robot cleaner separately.

SUMMARY

Therefore, it is an aspect of the present disclosure to provide a robot cleaner capable of serving as both an obstacle detection sensor to sense obstacles and a space recognition sensor to recognize the space surrounding the robot cleaner using one camera unit.

It is an aspect of the present disclosure to provide a robot cleaner capable of estimating a current position of the robot cleaner more accurately by correcting the current position of the robot cleaner estimated by using odometry information based on images acquired by the camera unit.

Additional aspects of the disclosure will be set forth in part in the description which follows and, in part, will be obvious from the description, or may be learned by practice of the disclosure.

According to an embodiment of the present disclosure, a robot cleaner includes a housing defining an appearance and a sensor assembly disposed in the housing and the sensor assembly includes a light source configured to emit light toward an area in front of the housing, a camera unit comprising a lens, a reflector configured to reflect light incident on a front of the housing toward a front region of the lens and a guide member hollow inside configured to guide light incident on a top of the housing toward a rear region of the lens.

The robot cleaner may include a transparent window disposed to cover a top of the guide member.

The guide member may include a barrier part arranged to be perpendicular to the top of the camera unit, a rear part extending to be inclined upward to a rear portion of the top of the housing, and a pair of side parts extending to be inclined to both sides of the housing and connecting the barrier part with the rear part in a curved surface A lower end of the barrier part may be spaced apart from the camera unit.

A lower portion of the barrier part may have a thickness reduced downward therefrom.

The reflector may be disposed above the camera unit to be spaced therefrom, and a bottom surface of the reflector forms a reflecting surface by extending to be inclined from a portion facing the lens toward the front and side portions of the front of the housing.

The camera unit may include an image sensor and the lens disposed above the image sensor.

The robot cleaner may include a band pass filter configured to limitedly transmit light having predetermined wavelengths among light incident on the front of the housing.

The band pass filter may transmit light having wavelengths of an infrared range.

The band pass filter may be disposed on an optical path between the front of the housing and the image sensor.

The band pass filter may be disposed to cover a front region of a top surface of the image sensor or disposed on an inner surface of the front of the housing.

The band pass filter may be disposed to limitedly cover a front region of an external surface of the lens.

The band pass filter may have a disc shape, is disposed in the camera unit, and comprises a filter part having a semicircular shape and disposed at a front portion of the band pass filter and a transmission part having a semicircular shape and disposed at a rear portion of the band pass filter.

The robot cleaner may include a controller configured to estimate a position of the robot cleaner based on information acquired by an inertia measurement unit (IMU) and odometry and correct the position of the robot cleaner based on images acquired by the camera unit.

The controller may set reference points based on a travel pattern of the robot cleaner and corrects the position of the robot cleaner based on the images acquired at the reference points.

The controller may set positions where a travel direction of the robot cleaner changes by a preset angle or greater as the reference points.

The controller may correct the position of the robot cleaner based on images acquired at reference points where the travel directions of the robot cleaner change in the same manner.

The controller may correct the position of the robot cleaner based on images acquired at reference points where a distance between the reference points is a preset distance or less.

The controller may correct the position of the robot cleaner by comparing feature points of images acquired at the reference points.

The controller may calculate at least one of a relative distance and angle between the feature points and corrects the position of the robot cleaner based thereon.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
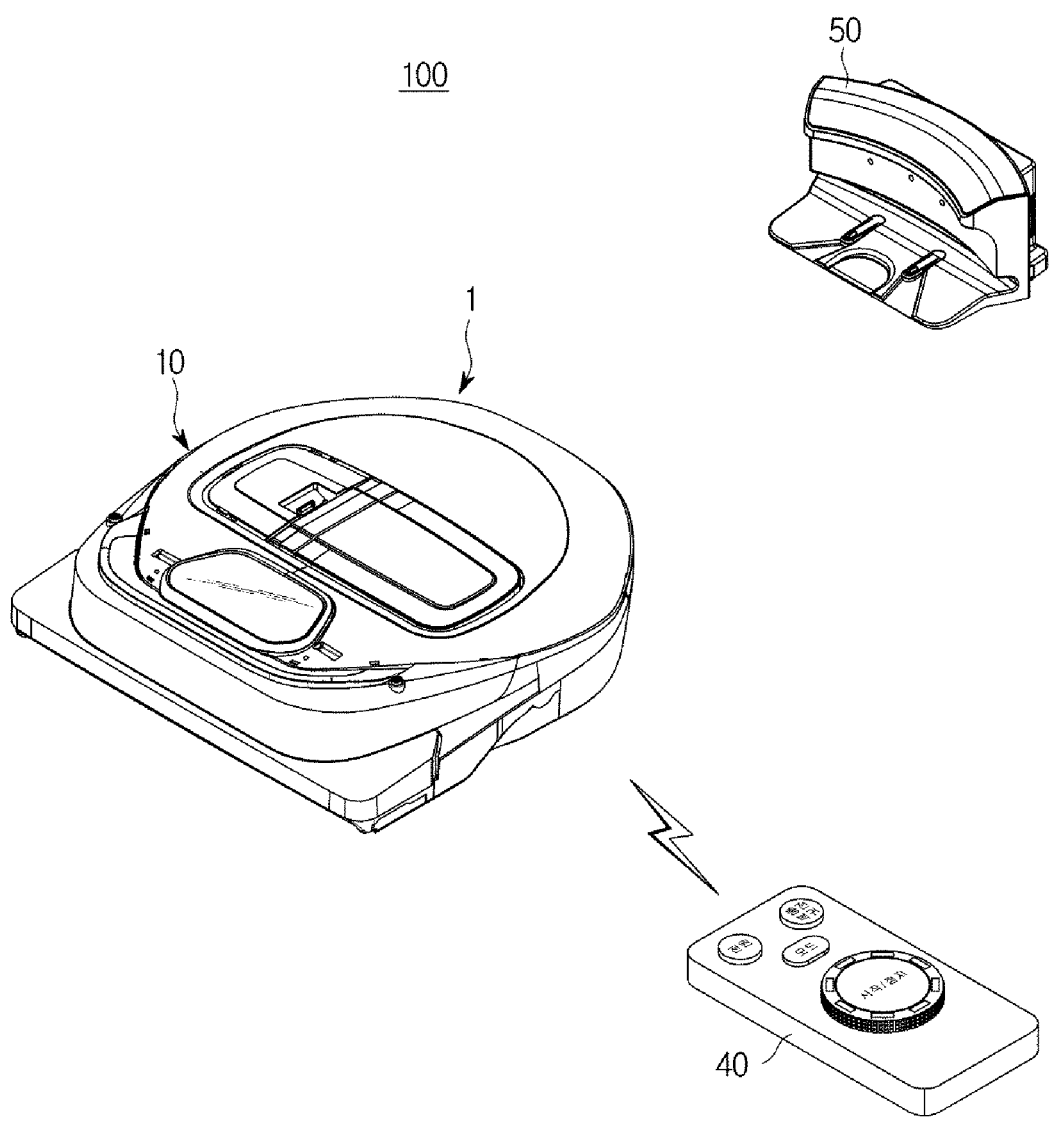
FIG. 1 is a diagram illustrating the configuration of a robot cleaner system including a robot cleaner according to an embodiment.

Reference will now be made in detail to the embodiments of the present disclosure, examples of which are illustrated in the accompanying drawings, wherein like reference numerals refer to like elements throughout.

Throughout the specification, the terms used are merely used to describe particular embodiments, and are not intended to limit the present disclosure. An expression used in the singular encompasses the expression of the plural, unless it has a clearly different meaning in the context.

Also, it is to be understood that the terms such as "include", "have", or the like, are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Hereinafter, embodiments of the present disclosure will in detail with reference to the accompanying drawings. In the drawing, parts unrelated to the descriptions are omitted for clear description of the disclosure.

In the following description, a robot cleaner will be described by way of example for descriptive convenience. However, the configuration and operational principle of the present disclosure will not be limited to the robot cleaner and may also be applied to all moving robots.

FIG. 1 is a diagram illustrating the configuration of a robot cleaner system 100 including a robot cleaner 1 according to an embodiment.

Referring to FIG. 1, the robot cleaner system 100 according to an embodiment includes the robot cleaner 1 configured to perform a cleaning operation while autonomously moving through a given area to be cleaned, a device 40 configured to remotely control the robot cleaner 1, and a charger station 50 located separately from the robot cleaner 1 and configured to recharge a battery of the robot cleaner 1.

The robot cleaner 1 is an apparatus that receives a control command from the device 40 and performs an operation corresponding to the control command. The robot cleaner 1 includes a rechargeable battery (not shown) and an obstacle sensor to avoid obstacles while autonomously moving through the area to be cleaned.

The robot cleaner 1 may also perform a process of localization and map-building, i.e., Visual Simultaneous localization and mapping (Visual SLAM), to recognize a position of the robot cleaner 1 with unknown information on a surrounding environment and generate a map of the environment using a camera unit 22.

The device 40 that is a remote control device configured to wirelessly transmit a control command required to control the movement of the robot cleaner 1 or perform the operation of the robot cleaner 1 may include a cellphone, a PCS phone, a smart phone, a personal digital assistant (PDA), a portable multimedia player (PMP), a laptop computer, a digital broadcasting terminal, a netbook, a tablet, and a navigation system.

In addition, the device 40 may further include all devices enabling implementation of various functions using various application programs such as a digital camera and a camcorder in which wired or wireless communication functions are embedded.

The device 40 may be a remote control with a simple shape. In general, remote controls transmit/receive signals to/from the robot cleaner 1 via infrared data association (IrDA).

In addition, the device 40 may transmit/receive wireless communication signals to/from the robot cleaner 1 using one of various communication methods including radio frequency (RF) communication, a wireless fidelity (Wi-Fi), Bluetooth, ZigBee, near field communication (NFC), and ultra-wide band (UWB) communication. The communication method is not limited so long as the device 40 and the robot cleaner 1 exchange wireless communication signals with each other.

The device 40 may further include buttons such as a power button configured to control the on/off operation of power of the robot cleaner 1, a return button configured to instruct the robot cleaner 1 to return to the charger station 50 for battery charging, a mode button configured to change a control mode of the robot cleaner 1, and a start/stop button to start or stop the operation of the robot cleaner 1 or to initiate, cancel, or confirm the control command, dials, and the like.

The charger station 50 for charging the battery of the robot cleaner 1 may include a guide member (not shown) configured to guide docking of the robot cleaner 1, and a connection terminal (not shown) may be provided at the guide member (not shown) to charge a power supply included in the robot cleaner 1.

The robot cleaner 1 may also include a housing 10 defining the appearance thereof.

Although not illustrated in the drawings, the housing 10 may include a fan motor configured to generate a suction force and a dust box configured to filter foreign substances from the air sucked by the fan motor and store the collected foreign substances. Wheels may be disposed at opposite sides on the bottom of the housing 10 to enable the robot cleaner 1 to move. Also, brushes 11 (FIG. 7) may be disposed at front portion on the bottom of the housing 10 to sweep foreign substances on the floor upward to aid suction of the foreign substances into the robot cleaner 1.

Figure 2:
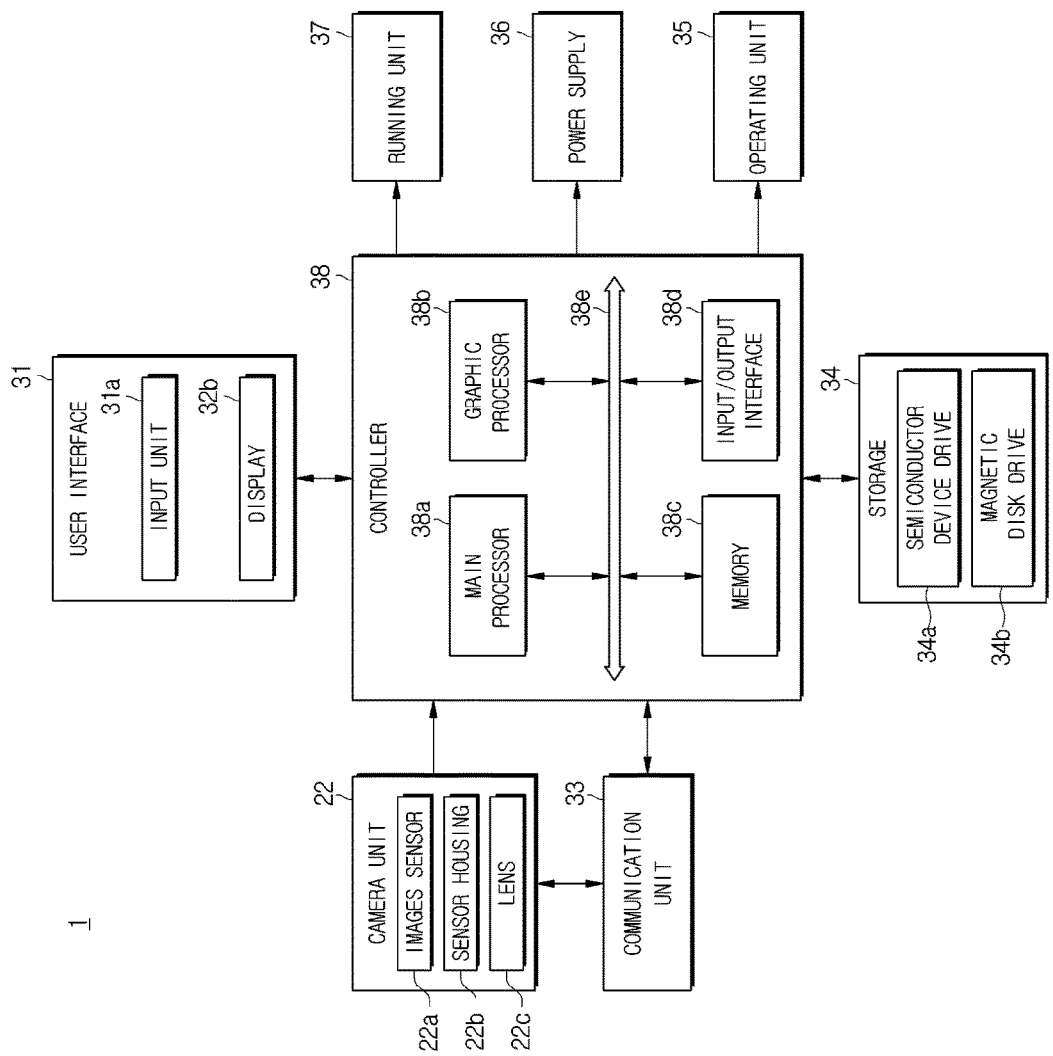
FIG. 2 is a block diagram illustrating the configuration of the robot cleaner according to an embodiment.

FIG. 2 is a block diagram illustrating the configuration of the robot cleaner 1 according to an embodiment.

Referring to FIG. 2, the robot cleaner 1 may further include a user interface 31, a camera unit 22, a communication unit 33, a storage 34, an operating unit 35, a power supply 36, a running unit 37, and a controller 38.

The user interface 31 may be disposed on the top surface of a main body of the robot cleaner 1 and may include an input unit 31a configured to receive a control command from the user and a display 32b configured to display information on the operation of the robot cleaner 1.

The input unit 31a may include a power button to turn on/off the robot cleaner 1, a start/stop button to start or stop the operation of the robot cleaner 1, a return button to return the robot cleaner 1 to the charger station 50, and the like.

In addition, the input unit 31a may employ a push switch to sense a pressure of the user, a membrane switch, or a touch switch to sense a contact of a body of the use.

The display 31b may display information of the robot cleaner 1 in response to the control command input by the user. For example, the display 31b may display the states of operation and power of the robot cleaner 1, a cleaning mode selected by the user, whether the robot cleaner 1 returns to the charger station 50, and the like.

In addition, the display 31b may include a self-emitting light emitting diode (LED) or organic light emitting diode (OLED) or a liquid crystal display (LCD) provided with a separated light source.

Although not shown in the drawings, the user interface 31 according to an exemplary embodiment may include a touch screen panel (TSP) to receive a control command from the user and display information on the operation corresponding to the input control command.

The touch screen panel may include a display to display the operation information and the control command input by the user, a touch panel to detect coordinates of a contact point of a part of the user's body, and a touch screen controller to determine the command input by the user based on the coordinates of the contact point detected by the touch panel.

The camera unit 22 may include an image sensor 22a to convert received light into image information, a sensor housing 22b to accommodate the image sensor 22a, a plurality of lenses 22c vertically aligned above the image sensor 22a to be spaced apart from each other, and a lens housing 22d coupled to the sensor housing 22b to support the lenses 22c.

The robot cleaner 1 according to an embodiment has an effect on reducing manufacturing costs because a single camera unit 22 may serve as both the image sensor 22a capable of recognizing the space surrounding the robot cleaner 1 and the sensor housing 22b capable of recognizing an obstacle located in front of the robot cleaner 1. These characteristics will be described in more detail later with reference to FIGS. 3 to 7.

In addition, an image obtained by the camera unit 22 is transmitted to the controller 38, and the controller 38 may correct a current position of the robot cleaner 1 based thereon.

The communication unit 33 may wirelessly communicate with the device 40 to receive a designated command from the user and transmit the received command to the controller 38.

Thus, the communication unit 33 may transmit/receive wireless communication signals to/from the device 40 by using various methods such as Radio Frequency (RF), Wireless Fidelity (Wi-Fi), Bluetooth, ZigBee, near field communication (NFC), and Ultra-Wide Band (UWB).

The storage 34 is a memory that stores images acquired by the camera unit 22 in real time and stores a map of the environment in which the robot cleaner 1 operates, an operating program and a travel pattern for the operation of the robot cleaner 1, position information of the robot cleaner 1 and obstacle information obtained while running, and the like.

Thus, the storage 34 may store control data to control the operation of the robot cleaner 1, reference data used while controlling the operation of the robot cleaner 1, operation data generated while the robot cleaner 1 performs a given operation, and user input information such as setting data input via the device 40 to allow the robot cleaner 1 to perform a predetermined operation.

Meanwhile, the storage 34 may serve as an auxiliary storage device to assist a memory 38c included in the controller 38 which will be described later and may be a non-volatile storage medium in which stored data is not lost even after the robot cleaner 1 is powered off.

The storage 34 may include a semiconductor device drive 34a that stores data in a semiconductor device and a magnetic disk drive 34b that stores data in a magnetic disk.

The operating unit 35 may perform various operations in accordance with a command of the user except for functions of the running unit 37 which move the robot cleaner 1 to a predetermined position.

Particularly, in the case of the robot cleaner 1, the operating unit 35 may perform functions of cleaning a given region. Thus, the operating unit 35 may include a fan motor to generate a suction force and a dust box to filter foreign substances from the air sucked by the fan motor and store the collected foreign substances. The operating unit 35 may further include brushes to sweep foreign substances on the floor upward to aid suction of the foreign substances into the robot cleaner 1, and the like.

The power supply 36 may include a battery that is electrically connected to various loads to operate the running unit 37 and the other part of the main body of the robot cleaner 1 and supplies driving power thereto. The battery may be implemented using a rechargeable secondary battery. After the main body of the robot cleaner 1 completes the operation and is docked with the charger station 50, the robot cleaner 1 may be charged by receiving power from the charger station 50.

In addition, the power supply 36 may be charged by receiving charging current from the charger station 50 when a remaining battery power is insufficient.

The running unit 37 may be disposed at opposite sides of the center of the main body of the robot cleaner 1 to allow the robot cleaner 1 to move forward or backward and turn left or right.

For example, the robot cleaner 1 may move forward or backward by rotating the running unit 37 forward or backward. In addition, the robot cleaner 1 may turn left with respect to the front of the robot cleaner 1 by simultaneously rotating a left running unit 37 backward and a right running unit 37 forward and may turn right with respect to the front of the robot cleaner 1 by simultaneously rotating the right running unit 37 backward and the left running unit 37 forward.

Running wheels may be disposed on the bottom of the main body of the robot cleaner 1 at both sides and may include a left running wheel disposed at a left side of the robot cleaner 1 with respect to the front of the robot cleaner 1 and a right running wheel disposed at a right side of the robot cleaner 1.

Meanwhile, the running wheels move the robot cleaner 1 by receiving a rotational force from a wheel driving motor.

The wheel driving motor generates a rotational force to rotate the running wheels and includes a left driving motor to rotate the left running wheel and a right driving motor to rotate the right running wheel.

The left and right driving motors may operate independently by receiving driving control signals respectively from the controller 38. By the left and right driving motors independently operating in such a manner, the left and right running wheels may rotate independently.

In addition, because the left and right running wheels rotate independently, the robot cleaner 1 may run in various manners, e.g., may move forward or backward, turn left or right, or and rotates.

The controller 38 may control the overall operation of the robot cleaner 1 including the robot cleaner 1.

Particularly, the controller 38 may include an input/output interface 38d configured to mediate data input and out between various components included in the robot cleaner 1 and the controller 38, a memory 38c configured to store programs and data, a graphic processor 38b to perform image processing, a main processor 38a configured to perform computing operations in accordance with the programs and data stored in the memory 38c and correct first position information of the robot cleaner 1, and a system bus 38e serving as a path for transmission and reception of data among the input/output interface 38d, the memory 38c, the graphic processor 38b, and the main processor 38a.

The input/output interface 38d may receive images or the like from the camera unit 22 and transmit the received images or the like to the main processor 38a, the graphic processor 38b, or the memory 38c via the system bus 38e.

In addition, the input/output interface 38d may transmit various control signals output from the main processor 38a to the running unit 37 and various control elements of the robot cleaner 1.

The memory 38c may retrieve control programs and control data for controlling the operation of the robot cleaner 1 from the storage 34 and store the retrieved results or may temporarily store images acquired by the camera unit 22 or position information of results of a position detector.

The memory 38c may include volatile memory such as static random-access memory (SRAM) and dynamic random-access memory (DRAM). However, the embodiment is not limited thereto. If required, the memory 38c may also include non-volatile memory such as flash memory, read only memory (ROM), erasable programmable read only memory (EPROM), and electrically erasable programmable read only memory (EEPROM).

The graphic processor 38b may convert the images acquires by the camera unit 22 into a format that may be stored in the memory 38c or the storage 34 or modify resolutions or sizes of the images acquired by the camera unit 22.

The main processor 38a may perform computing operation to process sensing results of the camera unit 22, control the running unit 37, correct the position of the robot cleaner 1, or correct a map based thereon in accordance with programs and data stored in the memory 38c.

The configuration of the robot cleaner 1 has been described above with reference to the accompanying drawings. Hereinafter, the configuration and effects of a sensing assembly 20 which are characteristics of the present disclosure will be described with reference to the drawings.

Figure 3:
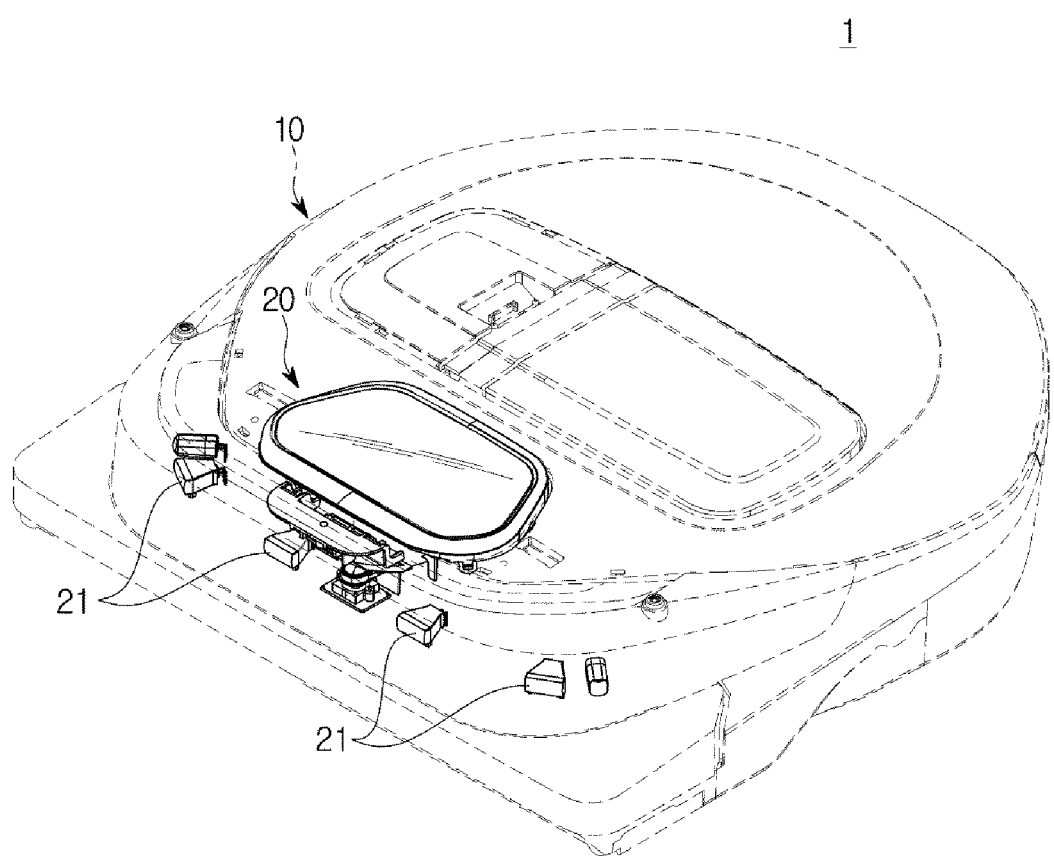
FIG. 3 is a perspective view illustrating an installation state of a sensing assembly applied to a robot cleaner according to an embodiment.
Figure 4:
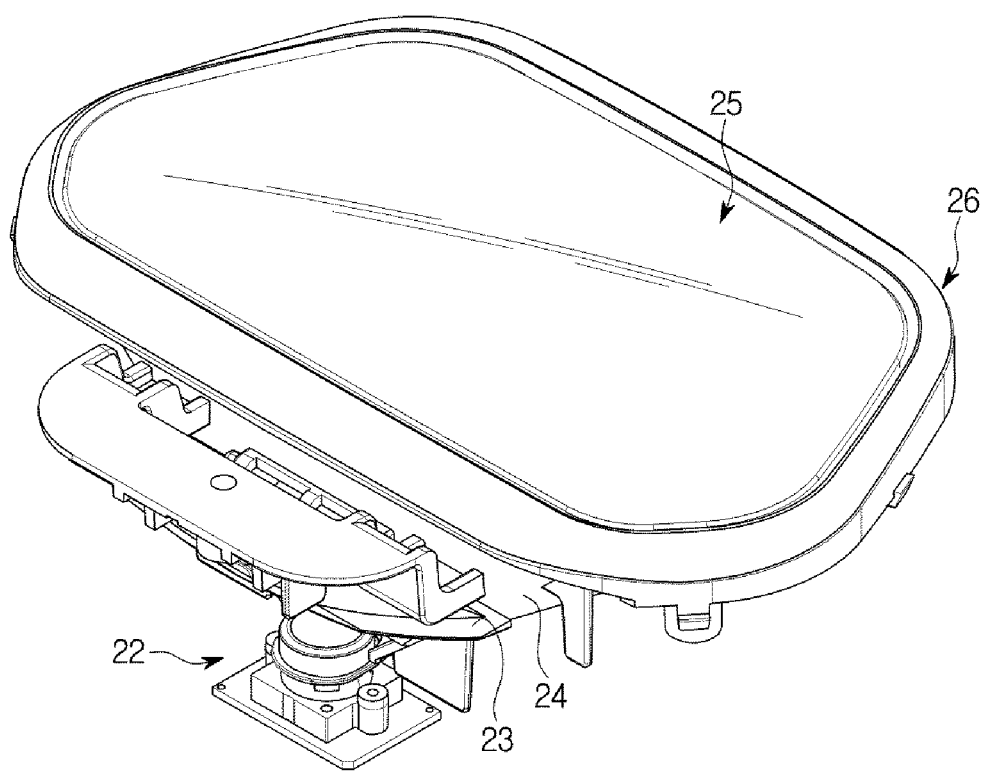
FIG. 4 is a perspective view illustrating a sensing assembly applied to the robot cleaner according to an embodiment.
Figure 5:
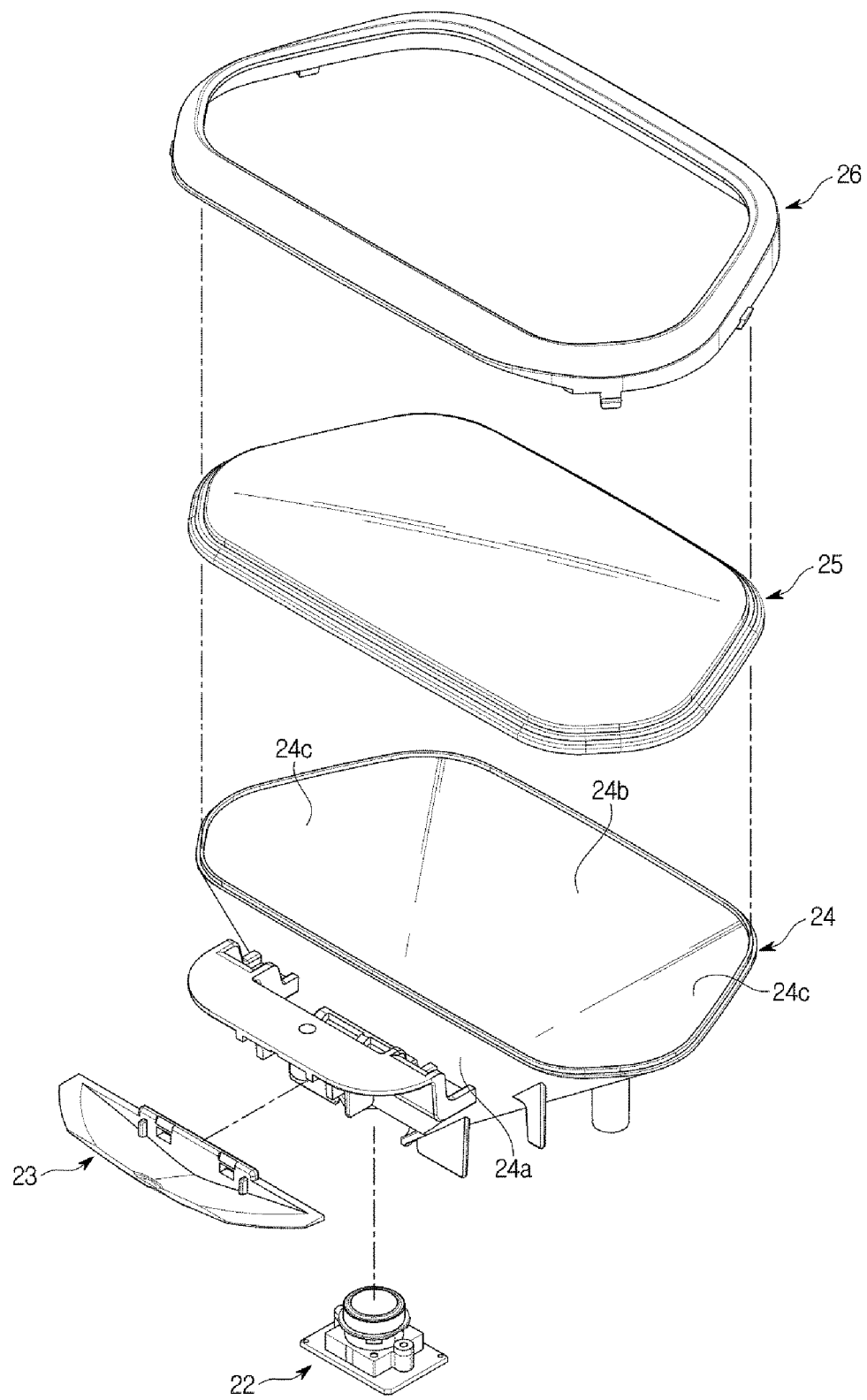
FIG. 5 is an exploded perspective view illustrating the sensing assembly according to an embodiment.
Figure 6:
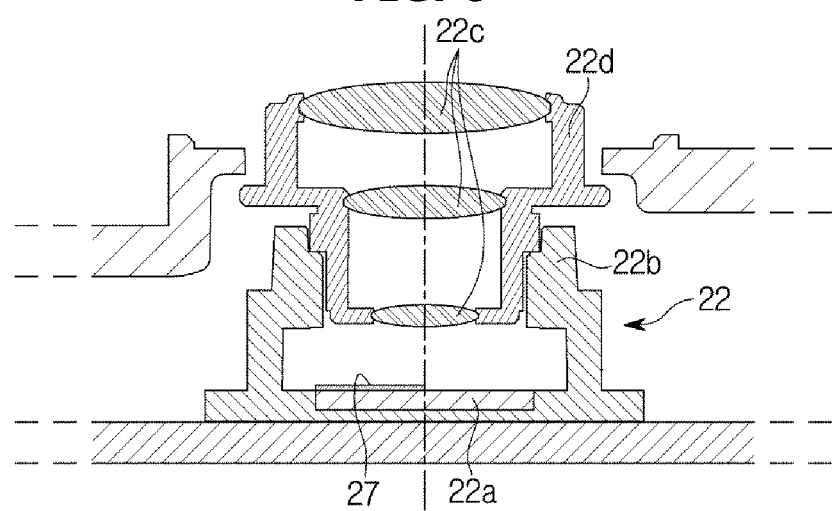
FIG. 6 is a cross-sectional view of a camera unit applied to the robot cleaner according to an embodiment.

FIG. 3 is a perspective view illustrating an installation state of a sensing assembly applied to a robot cleaner according to an embodiment. FIG. 4 is a perspective view illustrating a sensing assembly applied to the robot cleaner according to an embodiment. FIG. 5 is an exploded perspective view illustrating the sensing assembly according to an embodiment. FIG. 6 is a cross-sectional view of a camera unit applied to the robot cleaner according to an embodiment.

The sensor assembly 20 may include light sources 21 disposed at an inner front portion of the housing 10 and emitting light toward areas in front of a central and side portions of the front of the housing 10, a camera unit 22 configured to simultaneously receive light incident through the front of the housing 10 and light incident through the top of the robot cleaner 1, a reflector 23 configured to reflect light incident through the front of the housing 10 toward a front region of the top surface of a lens 22c of the camera unit 22, and a guide member 24 configured to guide the light incident through the top of the housing 10 toward a rear region of the top surface of the lens 22c.

A plurality of light sources 21 may be disposed in the inner front portion of the housing 10 at left and right sides to be spaced apart from each other. Although not illustrated in the drawings, the light source 21 may include a light emitting diode and a light guide member configured to separately guide light generated by the light emitting diode leftward and rightward.

As illustrated in FIG. 6, the camera unit 22 may include an image sensor 22a configured to receive light and convert the received light into image information, a sensor housing 22b configured to accommodate the image sensor 22a, a plurality of lenses 22c vertically aligned above the image sensor 22a to be spaced apart from each other, and a lens housing 22d coupled to the sensor housing 22b to support the lenses 22c.

The reflector 23 is installed on the front surface of a barrier part 24a of the guide member 24 which will be described later and may be disposed above the camera unit 22.

The bottom surface of the reflector 23 may form a reflecting surface 23a inclined upward from a portion thereof facing the lens 22c of the camera unit 22 toward the central and side portions of the front of the housing 10 and reflecting light.

Thus, light incident on the housing 10 through the central and side portions of the front of the housing 10 may be reflected by the reflecting surface 23a formed on the bottom surface of the reflector 23 and incident on the lens 22c of the camera unit 22.

The guide member 24 may be hollow inside to guide light incident through the top of the housing 10 and may have an area gradually decreasing as it goes downward as illustrated in FIG. 5.

The guide member 24 may include a barrier part 24a arranged to be perpendicular to the top of the camera unit 22, a rear part 24b extending to be inclined upward to a rear portion of the top of the housing 10, and two side parts 24c extending to be inclined to both sides of the housing and connecting both sides of the barrier part 24a with both sides of the rear part 24b.

The barrier part 24a serves to allow light incident through the front of the housing 10 and light incident through the top of the housing 10 to be separately incident on the camera unit 22. The reflector 23 may be installed on the front surface of the barrier part 24a.

A lower end of the barrier part 24a may be spaced apart from the lens 22c of the camera unit 22, and a lower portion of the barrier part 24a may be formed to have a thickness gradually reduced downward therefrom. This is intended to prevent excessive generation of unnecessary image information on the barrier part 24a.

Also, the sensor assembly 20 may be formed of a transparent material and may include a transparent window 25 disposed to cover the top of the guide member 24 and a holder 26 formed in a shape corresponding to outer edges of the transparent window 25 to cover the outer edges of the transparent window 25 and coupled to the top surface of the housing 10.

Thus, external light may be incident into the guide member 24 through the transparent window 25 while an inflow of foreign substances into the guide member 24 is prevented. In addition, the transparent window 25 may be maintained in a state of covering the top of the guide member 24 by the holder 26.

In addition, the robot cleaner 1 may include a band pass filter 27 that limits a transmission of light beams of predetermined wavelengths among light beams incident through the front of the housing 10, and the front of the housing 10 may be formed of a material with a dark color such as black such that some wavelengths of visible light are blocked by the housing 10.

The band pass filter 27 may be configured to limitedly transmit wavelengths of infrared light and may be disposed on an optical path between the front of the housing 10 and the image sensor 22a. The band pass filter 27 may be disposed in the camera unit 22 to cover a front portion of the top of the image sensor 22a.

Thus, among light beams incident on the front of the housing 10, visible light and the like, except for infrared light, is mostly blocked by the band pass filter 27, and only infrared light may arrive at the image sensor 22a.

Hereinafter, the operation of the robot cleaner 1 will be described with reference to FIG. 7.

Figure 7:
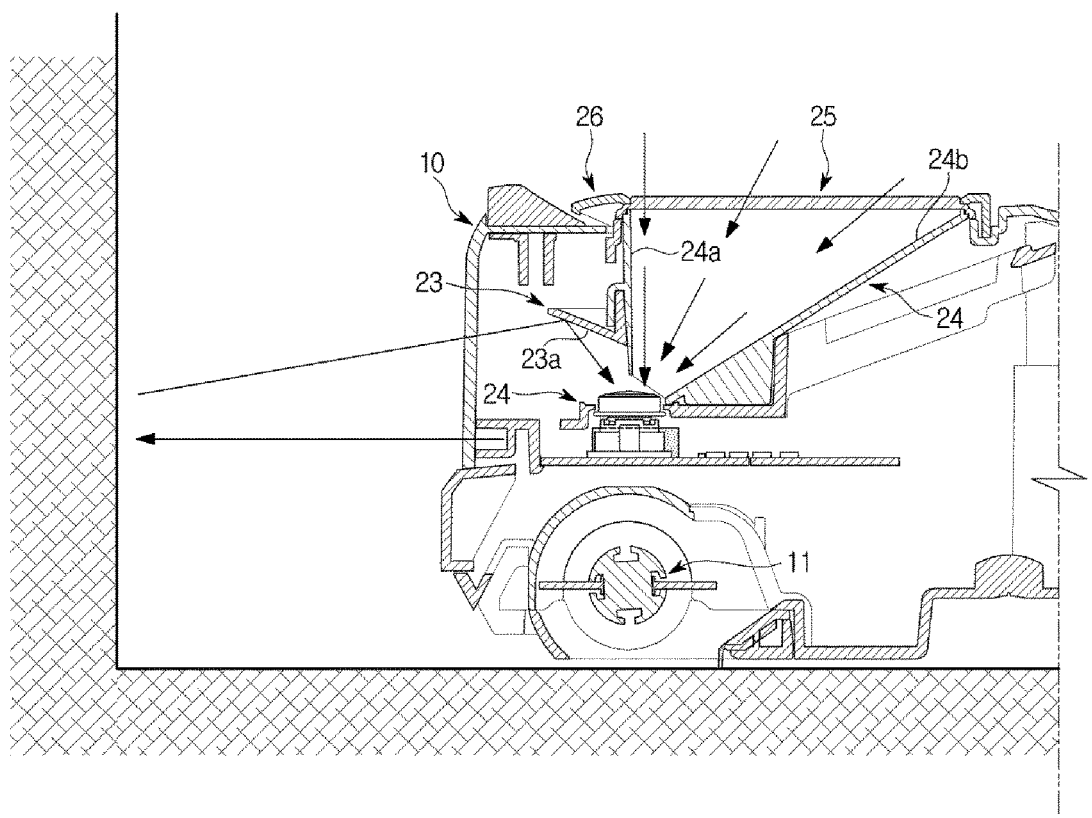
FIG. 7 is a schematic diagram illustrating the operation of the sensing assembly applied to the robot cleaner according to an embodiment.

FIG. 7 is a schematic diagram illustrating the operation of the sensing assembly applied to the robot cleaner 1 according to an embodiment. FIGS. 8 to 11 are cross-sectional views illustrating different positions of the band pass filter applied to the robot cleaner 1 according to an embodiment.

Referring to FIG. 7, while the robot cleaner 1 is running on the floor, the light sources 21 may emit light toward areas in front of a central and side portions of the front of the housing 10.

When an obstacle is not found near the central and side portions of the front of the housing 10 of the robot cleaner 1, light travels as far as it goes. Even when the light arrives at an obstacle far from the robot cleaner 1 and is reflected thereby, the light cannot be incident on the front of the housing 10 of the robot cleaner 1 due to a long distance between the obstacle and the robot cleaner 1.

However, if an obstacle is located near the front of the robot cleaner 1 as illustrated in FIG. 7, light emitted from the light source 21 may be reflected by the obstacle and the reflected light is incident into the housing 10 through the front surface of the housing 10 of the robot cleaner 1.

Light incident into the housing 10 arrives at the reflecting surface 23a provided on the bottom surface of the reflector 23 and is reflected by the reflecting surface 23a of the reflector 23 downward to be incident on the front region of the lens 22c of the camera unit 22.

Light is guided to the image sensor 22a by the lenses 22c. Because the front region of the top surface of the image sensor 22a is covered by the band pass filter 27, wavelengths of visible light are blocked by the band pass filter 27 and wavelength of infrared light may arrive at the image sensor 22a. Thus, the image sensor 22a may sense the existence of the obstacle located in front of the robot cleaner 1.

Also, while the robot cleaner 1 is running as described above, external light may continuously arrive at a rear region of the lens 22c of the camera unit 22 after passing through the transparent window 25 and the guide member 24. Light may be transmitted to the rear region of the image sensor 22a by the lens 22c and the image sensor 22a may convert the received light into image information.

Thus, a front half of the image sensor 22a may serve as an obstacle sensor that recognizes an obstacle by using infrared light and a rear half of the image sensor 22a may serve as an image sensor performing an intrinsic function thereof.

That is, the sensor assembly 20 applied to the robot cleaner 1 according to an embodiment may perform both recognition of an obstacle located in front of the robot cleaner 1 and acquisition of image information on the space above the robot cleaner 1 by using one camera unit 22.

Although the band pass filter 27 is disposed to limitedly cover a front portion of the top surface of the image sensor 22a according to the embodiment, the alignment is an example and the band pass filter 27 may be located in various positions.

Figure 8:
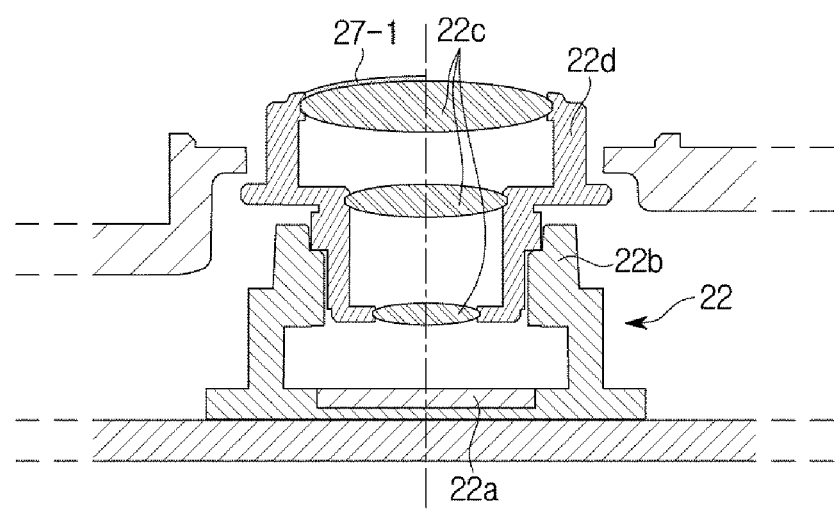
FIGS. 8, 9, 10, and 11 are cross-sectional views illustrating different positions of the band pass filter applied to the robot cleaner according to an embodiment.
Figure 9:
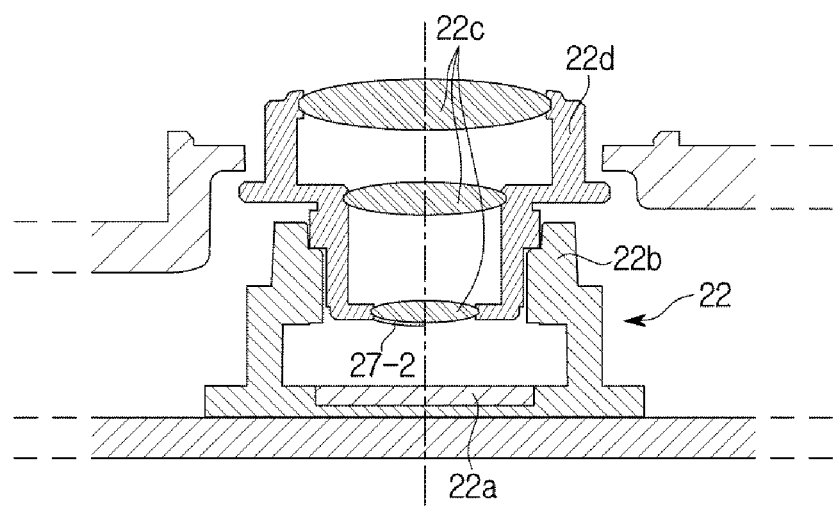

A band pass filter 27-1 may be disposed to limitedly cover a front portion of the top surface of the lens 22c located in a topmost layer among the lenses 22c as illustrated in FIG. 8 or a band pass filter 27-2 may be disposed to cover a front portion of the bottom surface of the lens 22c located in a bottommost layer among the lenses 22c as illustrated in FIG. 9. In addition, the band pass filter may be disposed to limitedly cover a front portion of an external surface of another lens among the lenses 22c.

Figure 10:
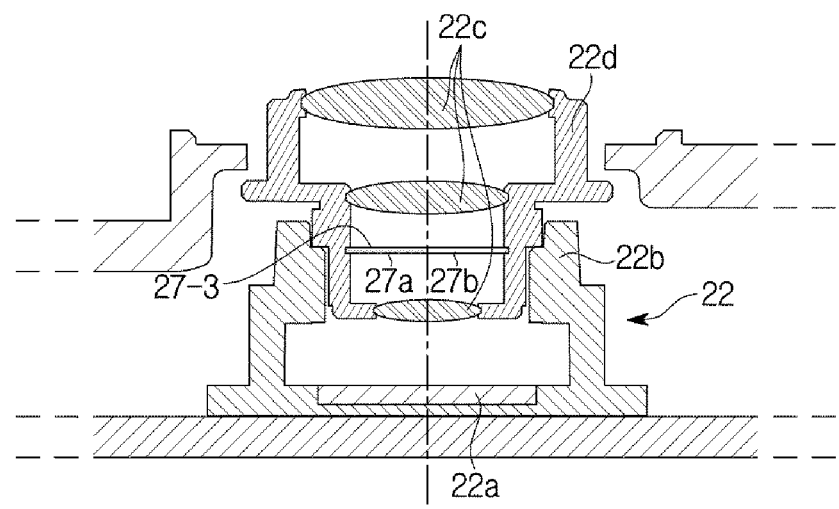

Also, a disc-shaped band pass filter 27-3 may be disposed between the lenses 22c of the camera unit 22 as illustrated in FIG. 10. In this case, the band pass filter 27-3 may include a filter part 27a having a semicircular shape and disposed at a front portion and a transmission part 27b having a semicircular shape and disposed at a rear portion.

The filter part 27a serves to only transmit wavelengths of infrared regions among light received from the front portion of the lens 22c and the transmission part 27b serves to transmit light received from the rear portion of the lens 22c.

Figure 11:
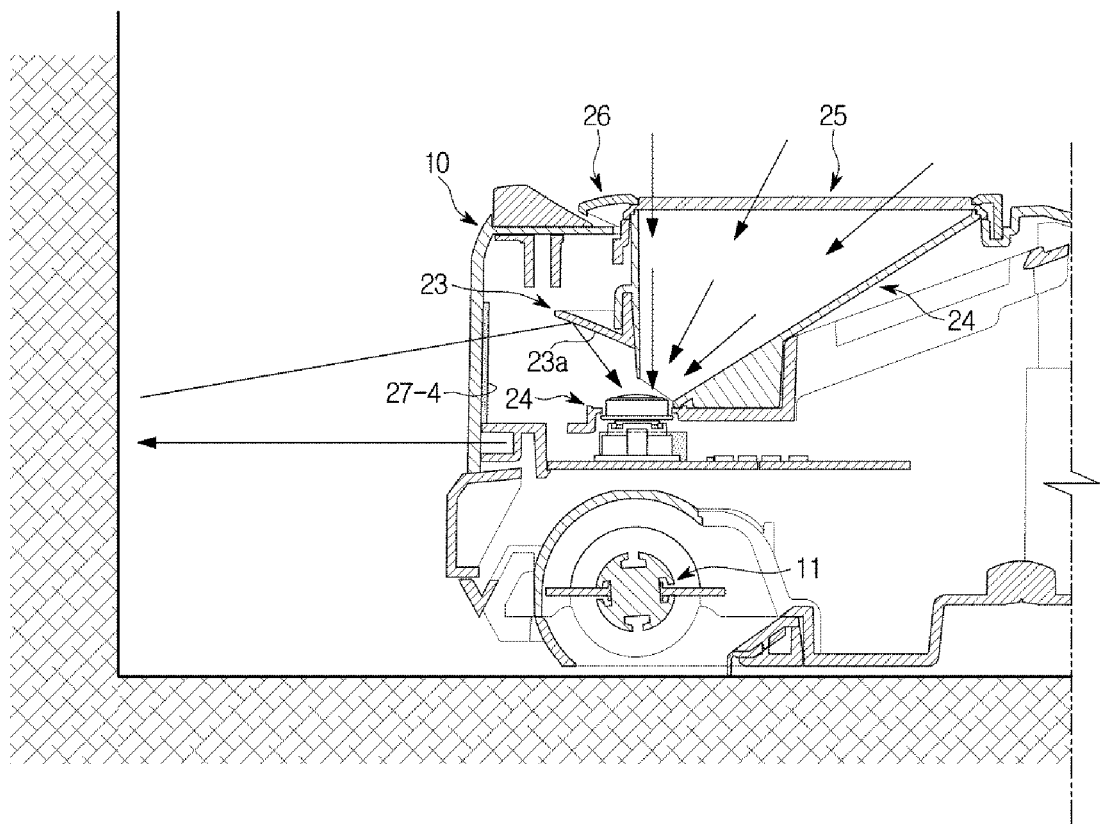

A band pass filter 27-4 may also be disposed on an inner surface of the front of the housing 10 as illustrated in FIG. 11.

Structural characteristics and effects of the robot cleaner 1 according to an embodiment have been described above. As described above, according to the present disclosure, manufacturing costs may be reduced because one camera may perform obstacle sensing and space recognition.

In addition, according to the present disclosure, the position of the robot cleaner 1 may be estimated more accurately based on images acquired by the camera unit. This characteristic will be described hereinafter with reference to the drawings.

Figure 12:
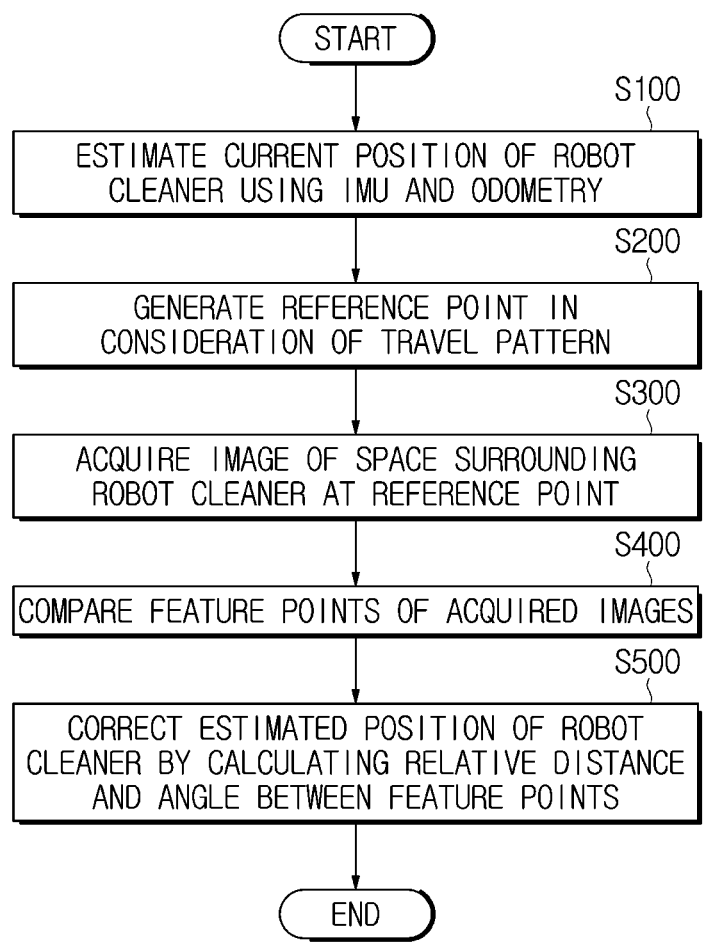
FIG. 12 is a flowchart for describing a flow of operation of the robot cleaner 1 according to an embodiment.
Figure 13:
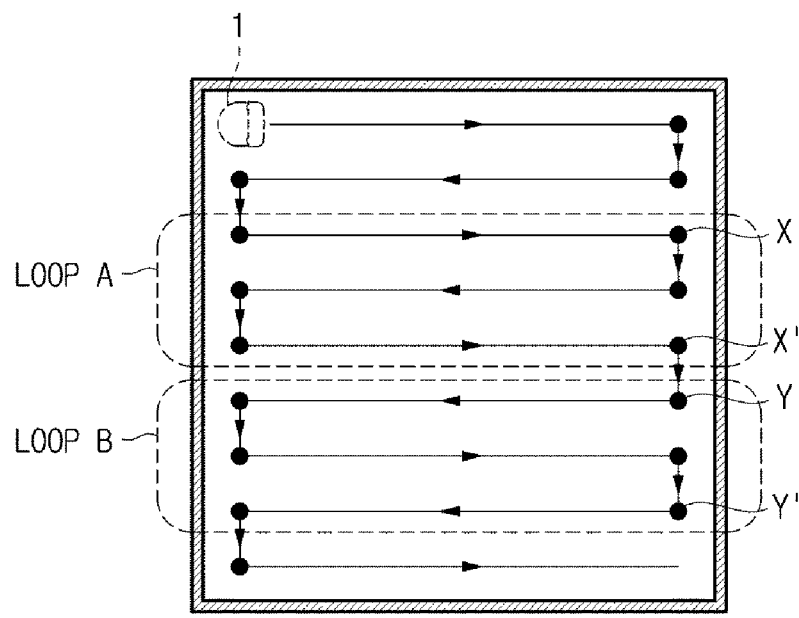
FIG. 13 is a diagram illustrating examples for forming loops using reference points according to an embodiment.
Figure 13:
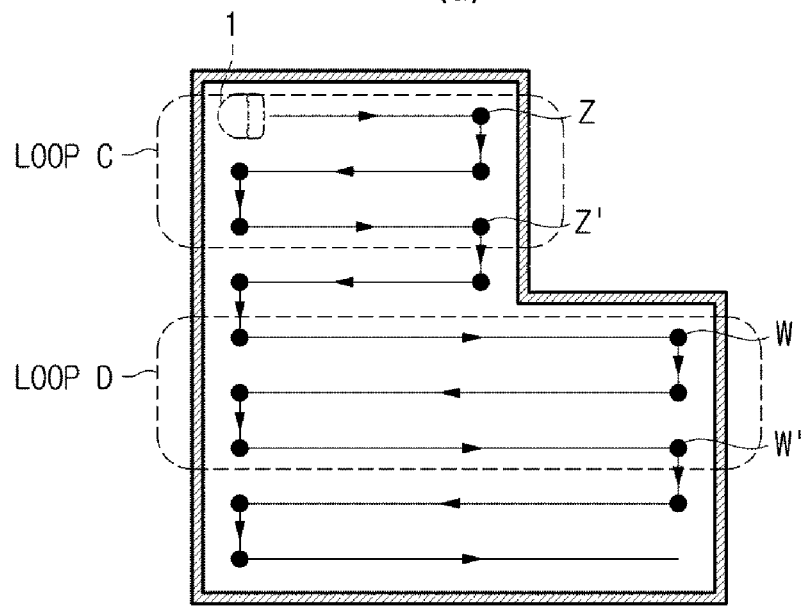
Figure 14:
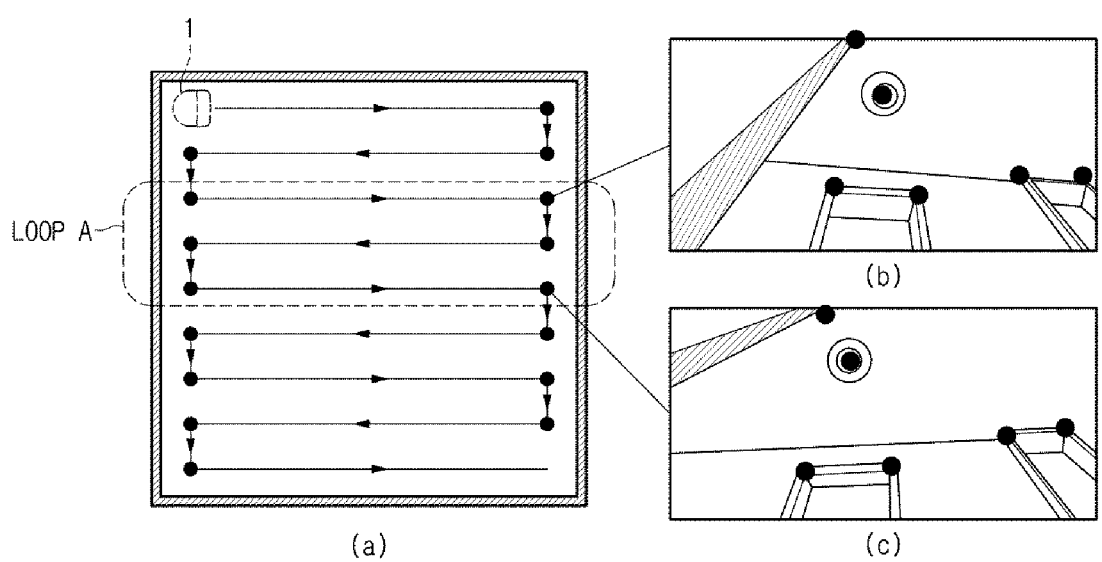
FIG. 14 is a diagram illustrating images acquired at the reference points according to an embodiment.
Figure 15:
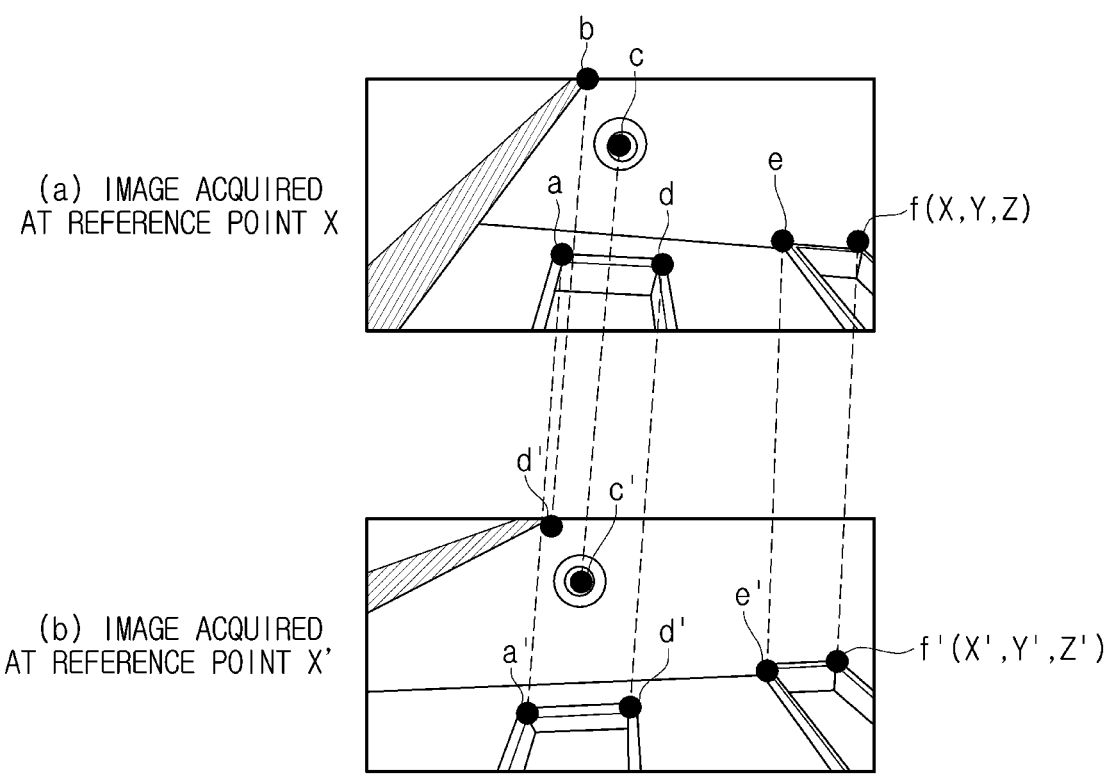
FIG. 15 is a diagram illustrating a method of matching feature points of images acquired at the reference points according to an embodiment.
Figure 16:
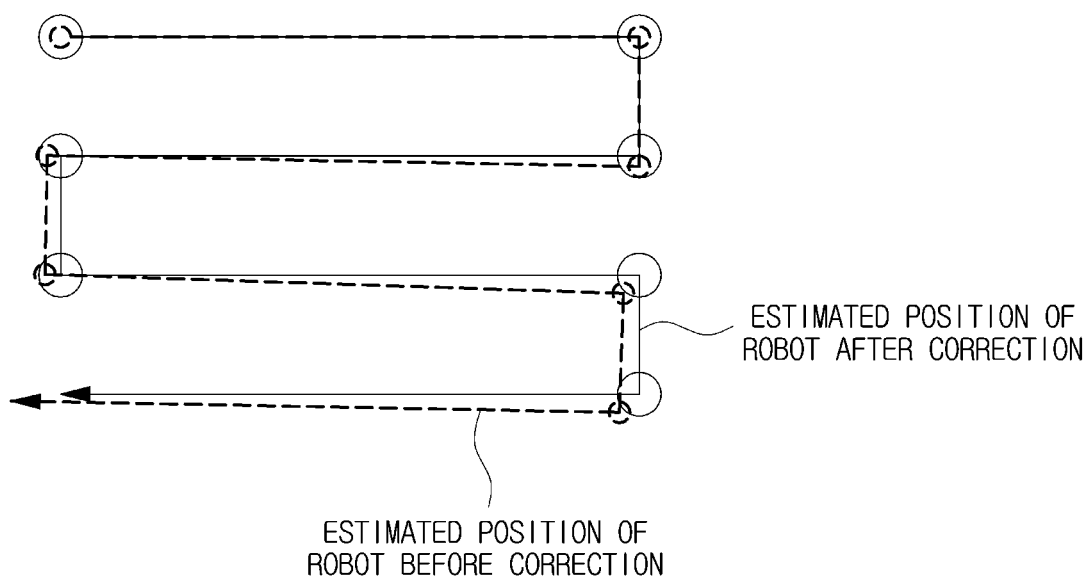
FIG. 16 is a diagram illustrating a result of correcting an estimated position of the robot cleaner according to an embodiment.

FIG. 12 is a flowchart for describing a flow of operation of the robot cleaner 1 according to an embodiment. FIG. 13 is a diagram illustrating examples for forming loops using reference points according to an embodiment. FIG. 14 is a diagram illustrating images acquired at the reference points according to an embodiment. FIG. 15 is a diagram illustrating a method of matching feature points of images acquired at the reference points according to an embodiment. FIG. 16 is a diagram illustrating a result of correcting an estimated position of the robot cleaner according to an embodiment.

Referring to FIG. 12, first, the robot cleaner 1 estimates a current position of the robot cleaner 1 based on information acquired by an inertia measurement unit (IMU) and odometry (operation S100).

The IMU refers to a sensor capable of measuring various kinds of motion information of a moving object such as acceleration, speed direction, distance, and the like after detecting an inertial force of the moving object and operates based on the principle of detecting an inertial force applied to an inertial body by acceleration applied to the object.

The IMUs may be classified into accelerometers and gyroscopes and operate in various manners such as a method of using laser beams and a non-mechanical method.

Odometry may estimate current position and direction of the robot cleaner 1 by using odometry information.

Odometry refers to a method of recognizing the position and direction of the robot cleaner 1 and may also be referred to as autonomous navigation.

The robot cleaner 1 to which odometry is applied may determine the position and direction of the robot cleaner 1 by acquiring speed information of the robot cleaner 1 by using an odometer or a wheel sensor and acquiring direction information by using a magnetic sensor or the like, and then calculating information on a moving distance and direction from an initial position of the robot cleaner 1 to a next position.

When the current position of the robot cleaner 1 is primarily estimated by using the IMU and odometry, the reference points are generated in consideration of a travel pattern of the robot cleaner 1 and images of the space surrounding the robot cleaner 1 are acquired at the reference points. (operation S200 and operation S300).

In general, there may be an error between the position estimated by the IMU and odometry and an actual position due to slip of wheels or external impact and an incremental error gradually increases as mileage increases because the IMU and odometry calculate positions and directions by integration.

Thus, the above-described process is a process of correcting the position of the robot cleaner 1 estimated by the IMU and odometry.

The reference points refer to positions where images used to correct the estimated position of the robot cleaner 1 are acquired and may also be referred to as nodes.

In general, a method of correcting an estimated position by using acquired images is performed by acquiring images of surroundings of a moving robot in real time and then correcting the estimated position of the robot using the acquired images. According to conventional methods, a number of computing processes are required because the images of surroundings of the moving robot are processed and compared in real time.

However, the robot cleaner 1 according to the present disclosure has effects of easily and simply correcting the estimated position because the robot cleaner 1 acquires images only at predetermined positions easy to correct the position in consideration of a travel pattern of the robot cleaner 1.

Particularly, the robot cleaner 1 may set only a position where a travel pattern of the robot cleaner 1, e.g., a travel direction of the robot cleaner 1, changes by preset degrees or greater as a reference point, acquire images of surroundings of the robot cleaner 1 at the reference point, and correct the estimated position of the robot cleaner 1 by using the images.

In general, the robot cleaner 1 has been widely used in homes. Because houses generally have rectangular structures, the robot cleaner 1 performs a cleaning operation while traveling in a zigzag pattern as illustrated in (a) of FIG. 13.

However, more errors may generally occur in the case where the travel direction changes in comparison with linear movement of the robot cleaner 1. Thus, a method of performing the correction operation based on the images acquired at positions where the travel direction changes is more efficient to reduce errors in comparison with a method of performing the correction operation based on the images acquired on a linear path.

For example, as illustrated in FIG. 13, the correction may be performed by acquiring images only at reference points where the direction of the robot cleaner changes by 90 degrees, e.g., points X, X', Y, and Y'. Although FIG. 13 illustrates the points where the direction of the robot cleaner 1 changes by 90 degrees as the reference points, the embodiment is not limited thereto and various angles in the range of 0 to 180 degrees may be applied thereto in accordance with user's settings or surrounding environments.

Also, correction performed by comparing images acquired at reference points where the travel directions change in the same manner is more efficient than that performed by comparing images acquired at all reference points. That is, it is more efficient to perform correction based on images acquired at reference points where the travel directions change in the same manner in the same loop after forming loops.

For example, in FIG. 13, X and X' are points where the direction of the robot cleaner 1 changes rightward by 90 degrees after moving to the right, and Y and Y' are points where the direction of the robot cleaner 1 changes leftward by 90 degrees after moving the left.

In this case, although both X and Y are reference points, comparison of images acquired at points X and Y is not efficient due to the difference of angles. Thus, it is more efficient to perform the correction based on the images acquired at points X and X' after forming a loop a including X and X' where the robot cleaner 1 changes in the same direction. In the same manner, the correction may be performed by comparing images acquired at points Y and Y' after forming a loop b including Y and Y'.

In addition, because a structure illustrated in (b) of FIG. 13 is not rectangular, there may be a high possibility that an image acquired at point Z may be different from that acquired at point W.

Thus, in this case, it is efficient to perform the correction based on images acquired at points Z and Z' after forming a loop c including Z and Z' where the robot cleaner 1 changes in the same direction. In the same manner, the correction may be performed by comparing images acquired at points W and W' after forming a loop d including W and W'.

After acquiring images at the reference points, a correction operation is performed based on the acquired images. Specifically, after comparing feature points of the acquired images and calculating relative distances and angles between the feature points, the position of the robot cleaner 1 is corrected based on the calculated results (operation S400 and operation S500).

FIG. 14 is a diagram illustrating feature points marked on images acquired at points X and X' of FIG. 13. FIG. 15 is a diagram illustrating a correction method by matching the feature points of the images acquired at points X and X'.

Referring to FIGS. 14 and 15, because the travel directions of the robot cleaner 1 change in the same manner at points X and X', similar images may be acquired at the points X and X'. Thus, because the acquired images have a lot of same feature points, it is easy to match feature points.

Particularly, the feature points may be positions with visual characteristics where the shape of an object changes such as an edge, ceiling, and door. Although FIG. 14 illustrates an edge of a door, a light bulb of the ceiling, and a vertex of a column are illustrated as the feature points, the embodiment is not limited thereto and any feature point that facilitates the correction may also be applied thereto.

After the feature points are determined as illustrated in FIG. 14, the correction operation is performed by matching the feature points as illustrated in FIG. 15.

That is, after respectively matching a and a', b and b', c and c', d and c', e and e', and f and f' which are the same feature points, changes in relative distances and angles between every two feature points are calculated using coordinates and the previously estimated position of the robot cleaner 1 is corrected using the results.

For example, f illustrated in (a) of FIG. 15 has (X, Y, Z) coordinates, and f' illustrated in (b) of FIG. 15 has (X', Y', Z') coordinates. Thus, changes in the relative distance and angle while the robot cleaner 1 moves from point X to point X' may be obtained by calculating a distance between the two feature points using the coordinates. Thus, the estimated position may be corrected by using the calculated values.

Although FIG. 15 illustrates a method of using three-dimensional coordinates of X, Y, Z, the embodiment is not limited thereto and the relative distance and angle between two coordinates may be calculated by using the two coordinates and angles ($\theta$).

FIG. 16 is a diagram illustrating a result of correcting the estimated position of the robot cleaner according to an embodiment.

Referring to FIG. 16, while there was an error between the estimated position of the robot cleaner 1 and the actual position of the robot cleaner 1 before correction, the position of the robot cleaner 1 may be more accurately estimated as illustrated in FIG. 16 after performing the correction according to the present disclosure.

The structural characteristics and effects of the present disclosure have been described with reference to the drawings.

Conventional robot cleaners are manufactured with high costs because a conventional robot cleaner includes a sensor for sensing obstacles and a camera unit for recognizing the space of a surrounding environment of the robot cleaner separately.

However, because one camera unit serves as an obstacle detection sensor to sense obstacles and a space recognition sensor to recognize the space surrounding the robot cleaner according to the present disclosure, the effect of manufacturing the robot cleaner in an economically feasible way may be obtained. In addition, because the position of the robot cleaner estimated based on the images acquired by the camera unit may be corrected, the current position of the robot cleaner may be estimated more accurately.

As is apparent from the above description, the robot cleaner according to the present disclosure may be manufactured in an economically feasible way because one camera unit serves as both an obstacle detection sensor to sense an obstacle and a space recognition sensor to recognize the space surrounding the robot cleaner. In addition, because the estimated position of the robot cleaner based on the images acquired by the camera unit may be corrected, the current position of the robot cleaner may be estimated more accurately.

Although the embodiments of the present disclosure have been described with reference limited examples and drawings, various other embodiments modified and changed by those of ordinary skill in the art based on the aforementioned embodiments may also be applied thereto. For example, even when the order of descriptions is changed, or the constituent elements such as systems, structures, devices, circuits, and the like are assembled or combined in a different manner from those described above and/or replaced or substituted by other constituent elements or equivalents, results, which are the same as or similar to those described above, may be obtained. Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A robot cleaner comprising:
   a housing;
   a light source configured to emit light toward an obstacle in front of the robot cleaner;
   a camera including a lens;
   a reflector configured to reflect the light emitted by the light source, reflected by the obstacle, and incident on a front of the housing toward a first region of the lens; and
   a guide member configured to guide light incident on a top of the housing toward a second region of the lens different from the first region.

2. The robot cleaner according to claim 1, further comprising a transparent window disposed to cover a top of the guide member.

3. The robot cleaner according to claim 1, wherein the guide member comprises a barrier portion arranged to be substantially planar-shaped, substantially perpendicular to a top of and substantially aligned with a center axis of the camera, and a rear portion connected to the barrier portion and substantially bowl-shaped.

4. The robot cleaner according to claim 3, wherein a lower end of the barrier portion is spaced apart from the camera.

5. The robot cleaner according to claim 3, wherein a lower portion of the barrier portion has a thickness that narrows in a direction toward the camera.

6. The robot cleaner according to claim 1, wherein the reflector is disposed above the camera, and a bottom surface of the reflector includes a reflecting surface and is inclined from a rear portion of the housing toward front and side portions of the housing.

7. The robot cleaner according to claim 1, wherein
the camera further comprises an image sensor, and
the lens is disposed above the image sensor.

8. The robot cleaner according to claim 7, further comprising a band pass filter configured to limit a transmission of the light incident on the front of the housing to the image sensor to light having a predetermined wavelength.

9. The robot cleaner according to claim 8, wherein the predetermined wavelength is light of an infrared range.

10. The robot cleaner according to claim 8, wherein the band pass filter is disposed on an optical path of the light between the front of the housing and the image sensor.

11. The robot cleaner according to claim 8, wherein the band pass filter is disposed to cover at least one of a portion of a top surface of the image sensor and an inner surface of the front of the housing.

12. The robot cleaner according to claim 8, wherein the band pass filter is disposed to cover a portion of a surface of the lens.

13. The robot cleaner according to claim 8, wherein the band pass filter has a disc shape, is disposed in the camera, and comprises a filter portion having a semicircular shape and disposed at a first portion of the band pass filter and a transmission portion having a semicircular shape and disposed at a second portion of the band pass filter different from the first portion.

14. The robot cleaner according to claim 1, further comprising a controller configured to estimate a position of the robot cleaner based on information acquired by an inertia measurement unit and odometry, and correct the position of the robot cleaner based on images acquired by the camera.

15. The robot cleaner according to claim 14, wherein the controller sets a plurality of reference points based on a travel pattern of the robot cleaner and acquires the images at the plurality of reference points.

16. The robot cleaner according to claim 15, wherein the plurality of reference points include positions where a travel direction of the robot cleaner changes by at least a predetermined angle.

17. The robot cleaner according to claim 16, wherein the plurality of reference points further include positions where the robot cleaner changes directions in an identical manner.

18. The robot cleaner according to claim 15, wherein a distance between the reference points is equal to or less than a predetermined value.

19. The robot cleaner according to claim 15, wherein the controller corrects the position of the robot cleaner by comparing feature points of the images acquired at the plurality of reference points.

20. The robot cleaner according to claim 19, wherein the controller calculates at least one of a relative distance and an angle between the feature points and corrects the position of the robot cleaner based the calculated at least one of the relative distance and the angle between the feature points.

* * * * *